United States Patent
Casavant et al.

(10) Patent No.: US 9,322,334 B2
(45) Date of Patent: Apr. 26, 2016

(54) DEFORMABLE MOUNTING ASSEMBLY

(71) Applicant: General Electric Company, Schenectady, NY (US)

(72) Inventors: Matthew Stephen Casavant, Greenville, SC (US); Kenneth Damon Black, Travelers Rest, SC (US)

(73) Assignee: General Electric Company, Schenectady, NY (US)

(*) Notice: Subject to any disclaimer, the term of this patent is extended or adjusted under 35 U.S.C. 154(b) by 535 days.

(21) Appl. No.: 13/658,514

(22) Filed: Oct. 23, 2012

(65) Prior Publication Data

US 2014/0109594 A1 Apr. 24, 2014

(51) Int. Cl.
*F02C 7/20* (2006.01)
*F01D 9/02* (2006.01)
*F23R 3/00* (2006.01)
*F23R 3/60* (2006.01)

(52) U.S. Cl.
CPC . *F02C 7/20* (2013.01); *F01D 9/023* (2013.01); *F23R 3/002* (2013.01); *F23R 3/005* (2013.01); *F23R 3/60* (2013.01); *F05D 2260/201* (2013.01); *F23R 2900/00005* (2013.01); *F23R 2900/00017* (2013.01); *F23R 2900/03044* (2013.01)

(58) Field of Classification Search
CPC .... F02C 7/20; F23R 3/60; F23R 2900/00005; F23R 2900/00017; F23R 2900/03044; F23R 3/002; F23R 3/005; F05D 2240/90; F05D 2240/91; F05D 2260/201; F01D 9/023
See application file for complete search history.

(56) References Cited

U.S. PATENT DOCUMENTS

| | | | | |
|---|---|---|---|---|
| 2,858,104 | A * | 10/1958 | Kelk et al. | 415/190 |
| 3,380,162 | A | 4/1968 | Heathe | |
| 4,438,939 | A | 3/1984 | Pask et al. | |
| 4,719,748 | A | 1/1988 | Davis, Jr. et al. | |
| 4,749,029 | A * | 6/1988 | Becker et al. | 165/47 |
| 4,934,888 | A * | 6/1990 | Corsmeier et al. | 411/353 |
| 5,035,573 | A * | 7/1991 | Tseng et al. | 415/173.2 |
| 5,236,309 | A | 8/1993 | Van Heusden et al. | |
| 5,709,516 | A | 1/1998 | Peterson et al. | |
| 5,755,093 | A * | 5/1998 | Palusis et al. | 60/266 |
| 6,045,310 | A * | 4/2000 | Miller et al. | 411/383 |
| 6,047,552 | A * | 4/2000 | Gross et al. | 60/752 |
| 6,216,442 | B1 * | 4/2001 | Belsom et al. | 60/797 |
| 6,341,485 | B1 * | 1/2002 | Liebe | 60/772 |

(Continued)

OTHER PUBLICATIONS

Belleville washer—Wikipedia, the free encyclopedia, Nov. 24, 2011, pp. 1-4, http://en.wikipedia.org/wiki/Belleville_washer.

(Continued)

*Primary Examiner* — Phutthiwat Wongwian
*Assistant Examiner* — Jason H Duger
(74) *Attorney, Agent, or Firm* — Ernest G. Cusick; Frank A. Landgraff

(57) ABSTRACT

A deformable fastener assembly for use with a gas turbine engine. The deformable fastener may be used to fasten a component of the gas turbine that is subjected to high temperatures and thermal deformation, such as an impingement sleeve assembly, to a rigid portion, such as the inner turbine shell of the gas turbine engine. The deformable fastener assemblies may permit components to be fastened to a rigid portion of the gas turbine with a consistent load input to permit frictional transient sliding of the component relative to the rigid portion of the gas turbine engine.

4 Claims, 4 Drawing Sheets

(56) References Cited

U.S. PATENT DOCUMENTS

| | | |
|---|---|---|
| 6,471,469 B2 | 10/2002 | Toffan et al. |
| 6,968,702 B2 | 11/2005 | Child et al. |
| 7,051,531 B2 * | 5/2006 | Oltmanns et al. .............. 60/752 |
| 7,178,325 B2 | 2/2007 | Arbona |
| 7,195,447 B2 | 3/2007 | Moniz et al. |
| 7,338,244 B2 * | 3/2008 | Glessner et al. ............. 411/401 |
| 7,805,946 B2 * | 10/2010 | Ohri et al. ...................... 60/760 |
| 7,849,696 B2 * | 12/2010 | De Sousa et al. ................ 60/804 |
| 8,069,670 B2 * | 12/2011 | Schmahl et al. ................. 60/753 |
| 8,123,406 B2 * | 2/2012 | Erickson et al. ............. 374/179 |
| 8,454,290 B2 * | 6/2013 | Schaser et al. ............... 411/544 |
| 8,607,577 B2 * | 12/2013 | Ruberte Sanchez et al. ... 60/796 |
| 8,794,889 B2 * | 8/2014 | Aukzemas et al. ........... 411/353 |
| 8,800,292 B2 * | 8/2014 | Bottcher et al. ................ 60/752 |
| 2008/0127652 A1 * | 6/2008 | Putz ................................. 60/752 |
| 2010/0011576 A1 * | 1/2010 | Sutcu et al. .................. 29/889.2 |
| 2010/0034616 A1 * | 2/2010 | Johnson ........................ 411/395 |
| 2013/0154169 A1 * | 6/2013 | Myers et al. .................. 267/103 |
| 2014/0248146 A1 * | 9/2014 | Sander et al. ............... 415/213.1 |

OTHER PUBLICATIONS

Double Pipe Heat Exchangers—BASF-YPC Company Ltd., IPS Project, Nanjing, China, pp. 1-26, I:\18584805/106/G/Mechanical/FINALSPECS/Exchangers/DblPipeRev2.doc, Jan. 15, 2002.

\* cited by examiner

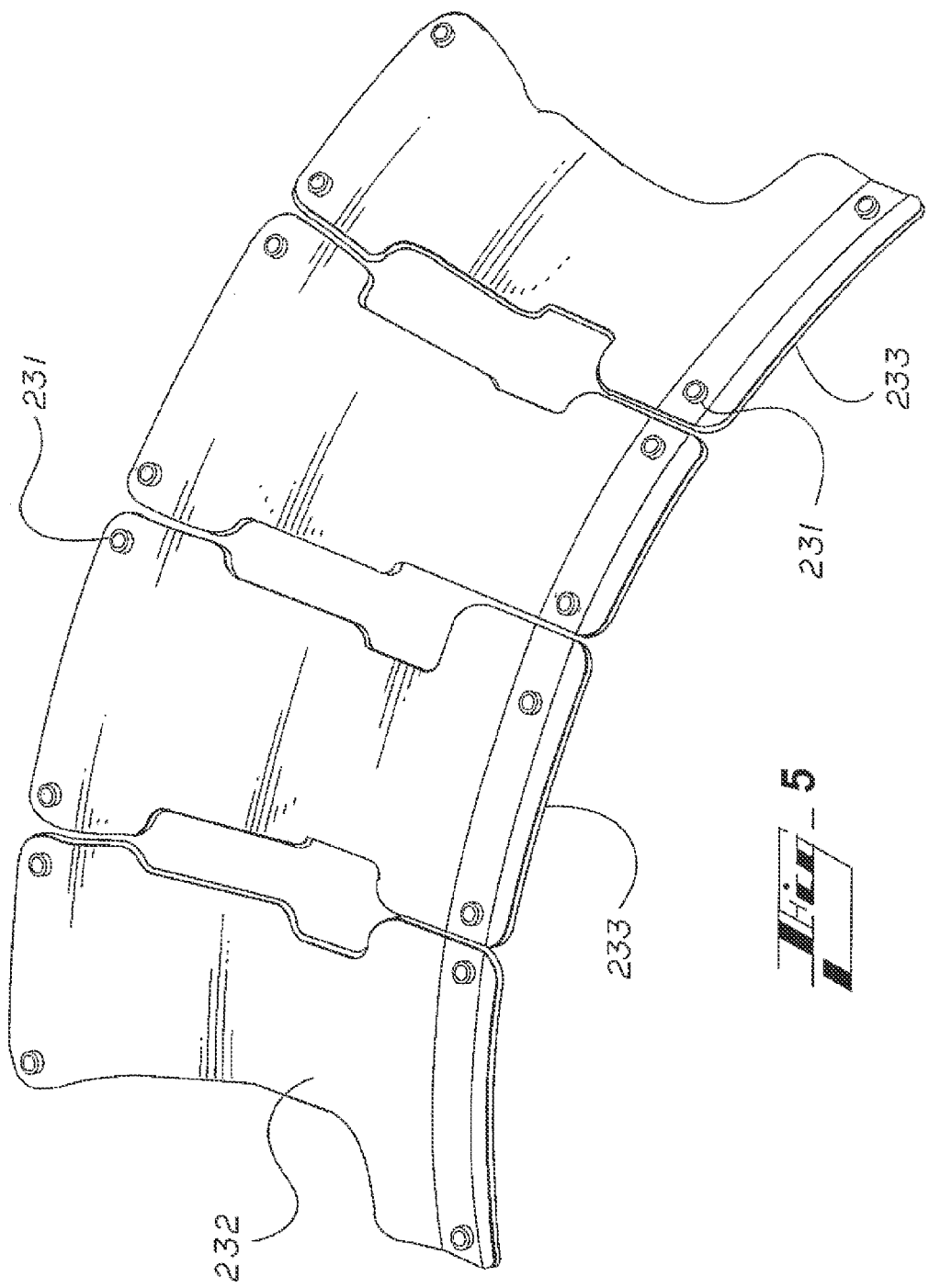

DEFORMABLE MOUNTING ASSEMBLY

TECHNICAL FIELD

The subject matter disclosed herein relates generally to deformable mounting assemblies, and more specifically to deformable mounting assemblies for mounting an impingement sleeve assembly to an inner turbine shell of a gas turbine engine.

BACKGROUND OF THE INVENTION

In general, a gas turbine engine operates in an extremely harsh environment characterized by very high temperatures, temperature gradients, and vibrations. A gas turbine engine typically includes a compressor for compressing an incoming flow of air, one or more combustors for mixing the compressed air with a flow of fuel and igniting the air/fuel mixture, and a turbine to drive the compressor and an external load such as an electrical generator. The combustors and other parts of the inner turbine shell are subject to extremely high temperatures from the combustion gases. An impingement sleeve assembly comprising impingement sleeve panels is therefore generally used to direct cooling air to hot regions of the outside diameter of the inner turbine shell. The impingement sleeve assembly may include perimeter skirts, which are typically welded onto the perimeter of each impingement sleeve panel. The perimeter skirts, in turn, fit into perimeter sealing grooves in the inner turbine shell. Each of the impingement sleeve panels is then typically bolted to the inner turbine shell, thereby forming the impingement sleeve assembly.

The impingement sleeve panels are typically a relatively thin material, and as a consequence, may have a tendency to expand or contract upon heating and cooling, respectively, at a faster rate than the inner turbine shell, to which they are fastened. This can result in transient sleeve stress, fatigue to the impingement sleeve panels, and shortened impingement sleeve life. Additionally, it may be difficult, even with a torque wrench, to torque down on the bolts used to fasten the impingement sleeve panels to the inner turbine shell with a reliable, repeatable degree of torque and consequent load along the axis of the bolts.

There is therefore a desire to provide a fastening system for fastening an impingement sleeve assembly to the inner turbine shell that allows for transient differential growth of the impingement sleeve assembly, while keeping the impingement sleeve assembly positively loaded for high cycle fatigue and model tuning. There is further a desire to provide a fastening system that can provide consistent impingement sleeve load input to allow for transient sliding of the impingement sleeve assembly and deterministic load along the axis of the fastening system.

BRIEF DESCRIPTION OF THE INVENTION

The present disclosure describes a fastener assembly for fastening a component subjected to thermal deformation to a rigid portion of a gas turbine engine. The fastening system may include at least one fastener comprising a deformable member adapted to deflect in response to an axial force being applied to the fastener.

The present disclosure further describes an impingement sleeve assembly of a gas turbine comprising a plurality of impingement sleeve panels, which panels are fastened to the inner turbine shell with a plurality of deformable fasteners. Each deformable fastener may include a fastener having a deformable member positioned between the head of the fastener and a mounting flange on the impingement sleeve panel.

By employing the deformable member as described herein, the fastener may be torqued down and may thereby provide a repeatable deflection and thus repeatable load into the deformable member. This may create a loaded sliding connection to relieve transient sleeve stress due to the differing time constant of the impingement sleeve panels relative to the inner turbine shell. The deformable fastener may thus allow transient differential growth while keeping the impingement sleeve panels positively loaded for high cycle fatigue capability and model tuning. The deformable fastener assembly may thus allow relative frictional sliding between two mounted bodies, generally perpendicular to the axis of the deformable fastener assembly, by means of the deterministic axial load enabled by the deformable member.

These and other features of the present disclosure will become apparent to one of ordinary skill in the art upon review of the following detailed description of the preferred embodiments when taken in conjunction with the several drawings and the appended claims.

BRIEF DESCRIPTION OF THE DRAWINGS

FIG. 5 is an isometric view of impingement sleeve panels as described herein.

DETAILED DESCRIPTION OF ILLUSTRATIVE EMBODIMENTS

Figure 1:
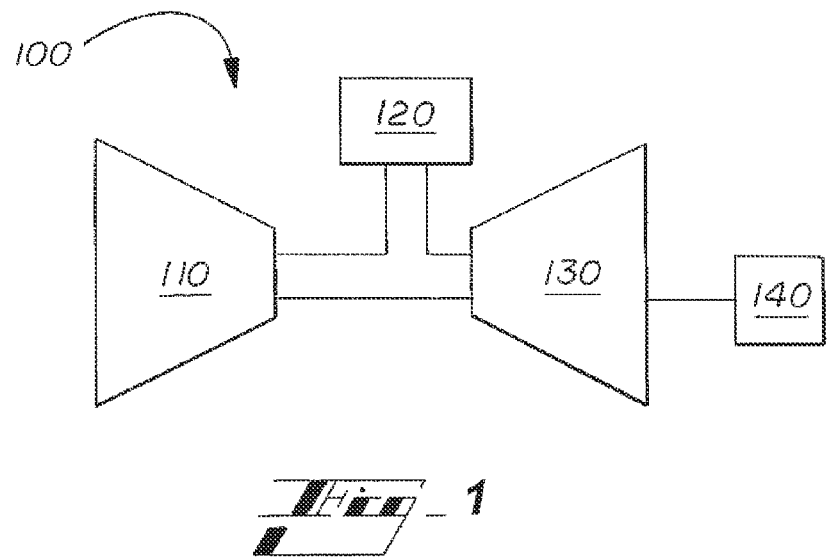
FIG. 1 is a schematic view of a gas turbine engine.

Referring now to the drawings in which like numbers refer to like elements throughout the several views, FIG. 1 shows a schematic view of a gas turbine engine, generally 100. As described above, the gas turbine engine 100 may include a compressor 110 to compress an incoming flow of air. The compressor 110 delivers the compressed flow of air to a combustor 120. The combustor 120 mixes the compressed flow of air with a flow of fuel and ignites the mixture. The hot combustion gases are in turn delivered to a turbine 130 so as to drive the compressor 110 and an external load 140 such as an electrical generator and the like. The gas turbine engine 100 may use other configurations and components herein.

Figure 2:
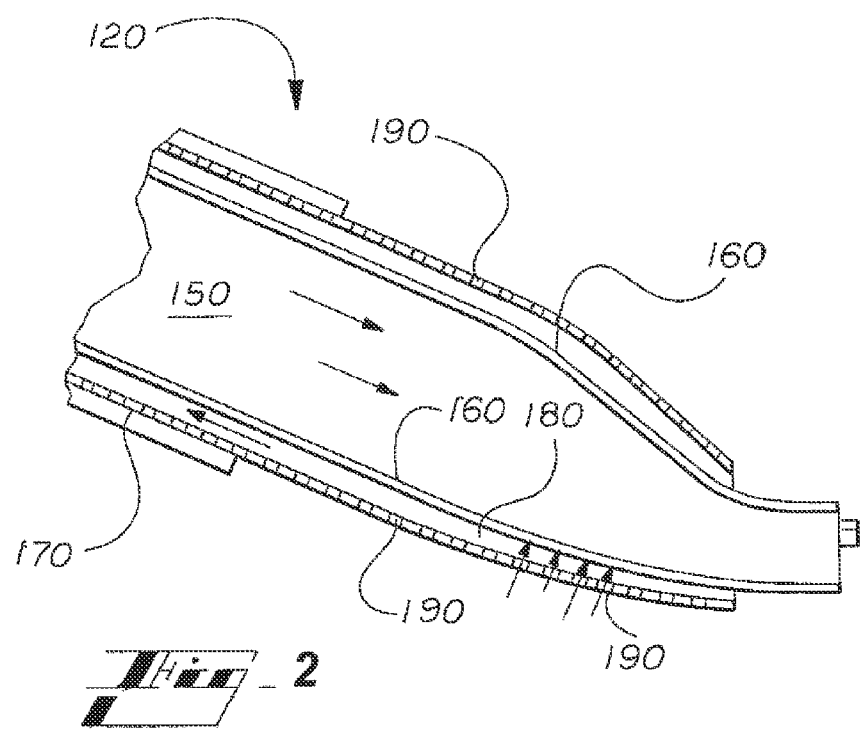
FIG. 2 is a side cross-sectional view of a combustor with an impingement sleeve.

FIG. 2 shows a further view of the combustor 120. In this example, the combustor 120 may be a reverse flow combustor. Any number of different combustor configurations 120, however, may be used herein. For example, the combustor 120 may include forward mounted fuel injectors, multi-tube aft fed injectors, single tube aft fed injectors, wall fed injectors, staged wall injectors, and other configurations that may be used herein.

As described above, high pressure air may exit the compressor 110, reverse direction along the outside of a combustion chamber 150, and reverse flow again as the air enters the combustion chamber 150 where the fuel/air mixture is ignited. Other flow configurations may be used herein. The combusted hot gases provide high radiative and convective heat loading along the combustion chamber 150 before the gases pass on to the turbine 130. Cooling of the combustion chamber 150 thus is required given the high temperature gas flow.

The combustion chamber 150 thus may include a liner 160 so as to provide a cooling flow. The liner 160 may be positioned within an impingement sleeve 170 so as to create an airflow channel 180 therebetween. At least a portion of the air flow from the compressor 110 may pass through the impingement sleeve 170 and into the airflow channel 180 through one or more holes 190 in the impingement sleeve 170. The air may be directed over the liner 160 for cooling the liner 160 before entry into the combustion chamber 150 or otherwise.

Figure 3:
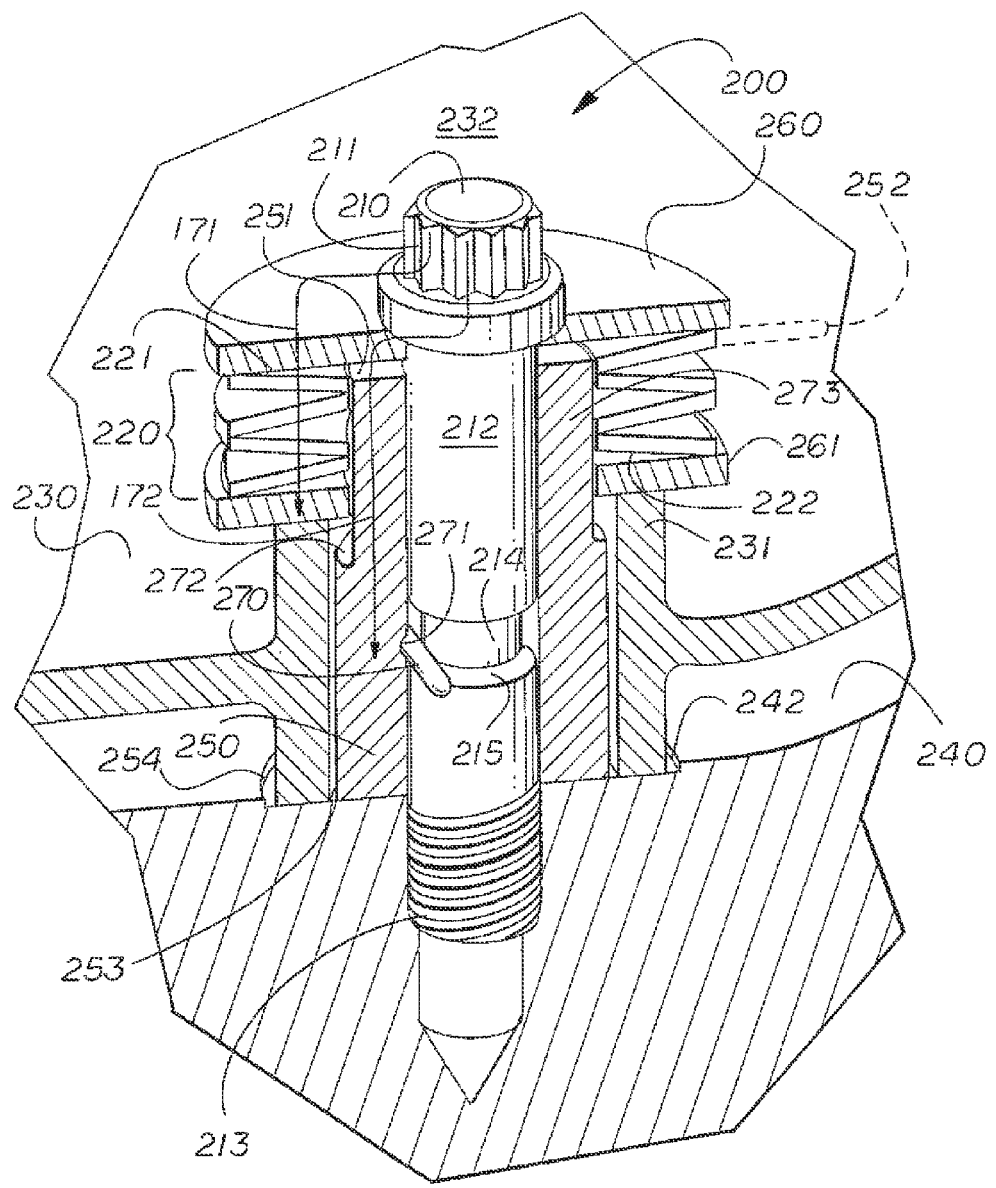
FIG. 3 is an isometric, partial cutaway view of a fastener assembly as described herein.

Referring now to FIG. 3, there is shown one embodiment of a deformable fastener assembly, generally 200, that may be used to fasten a component subjected to thermal deformation, such as an impingement sleeve assembly, to a rigid portion, such as the inner turbine shell of a gas turbine engine, as described herein. As shown, the deformable fastener assembly 200 may include a fastener 210, such as a bolt and the like. Although a bolt 210 is depicted in FIG. 3, other fasteners, including by way of example but not limitation, screws, pins, rivets, and the like may also be employed as the fastener 210. The fastener 210 may include a deformable member 220, exemplary embodiments of which shall be described subsequently. In the embodiment illustrated in FIG. 3, the fastener assembly 200 may fasten an impingement sleeve assembly 230 to an inner turbine shell 240. The deformable member 220 may allow the creation of a loaded frictional sliding connection between the impingement sleeve assembly 230 and the inner turbine shell 240.

As further illustrated in FIG. 3, the fastener 210 may comprise a bolt or other fastener having a head 211, a shaft 212, and a threaded section 213. The fastener 210 may further include a notch or groove 214. As further illustrated, the fastener 210 may include positioned thereon a bushing 250. The fastener 210 may further comprise one or more washers 260, 261. In the embodiment shown in FIG. 3, these washers 260, 261 may be positioned so as to capture the deformable member 220 therebetween. One of the washers, an upper washer 260, may be positioned around the shaft 212 between the head 211 and the top surface 251 of the bushing 250 and the top surface 221 of the deformable member 220. The other washer, a lower washer 261, may be positioned around the bushing 250 on the opposing lower side 222 of the deformable member 220. This lower washer 261 may seat on a mounting flange 231 of the impingement sleeve assembly 230.

As illustrated and previously described, the deformable fastener assembly 200 may include a deformable member, 220. Although the deformable member 220 as illustrated in FIG. 3 may comprise a plurality of Belleville washers arranged alternately, other deformable members may be used, including by way of example but not limitation, one or more Belleville washers in parallel (i.e., stacked in series), Belleville washers arranged in both alternate and parallel orientations, one or more spring washers, one or more washer faced springs, one or more mechanical springs, and combinations thereof. The deformable member 220 may be configured to provide a consistent load on the impingement sleeve assembly 230, independent of fastener torque input or fastener axial loading. The amount of this consistent load may, in turn, be pre-determined by selecting the stiffness of the deformable member 220 so as to permit transient frictional sliding of the impingement sleeve assembly 230 after the fastener 210 has been seated, i.e., with the upper washer 260 contacting the bushing top surface 251, thereby relieving impingement sleeve stress due to the differing time constant for thermal creep associated with the impingement sleeve assembly 230 relative to that of the inner turbine shell 240. As illustrated, the impingement sleeve load path 171 may pass from the fastener head 211 to the upper washer 260, through the deformable member 220, to the lower washer 261, to the mounting flange 231 of the impingement sleeve assembly 230. The fastener load path 172 may pass from the fastener head 211 to the upper washer 260, to the bushing 250, to the inner turbine shell 240.

The deformable fastener assembly 200 illustrated in FIG. 3 is depicted with a slight gap 252 between the upper washer 260 and the bushing top surface 251 when the upper washer is resting on the top surface 221 of the deformable member prior to a load being applied to the fastener 210. This gap 252 closes to essentially zero once the fastener 210 is seated, for example, in the case of a bolt, by torqueing down on the bolt until the upper washer 260 contacts the top surface 251 of the bushing 250, at which point the deformable member 220 is fully loaded in compression, providing a constant load via the lower washer 261 to the mounting flange 231, regardless of any additional torque applied to the fastener 210.

As further illustrated in FIG. 3, the bushing 250 of the deformable fastener assembly 200 may be received within the mounting flange 231 of the impingement sleeve panel 232. Both the bushing 250 and the mounting flange 231, in turn, may be received within a detent 242 in the inner turbine shell 240. As further illustrated, there may exist a slight gap 253 made possible by the bushing 250 having a smaller outside diameter than the inside diameter of the mounting flange 231 into which the bushing 250 is received. This gap 253 may make lateral frictional sliding motion of the impingement sleeve panels 232 of the impingement sleeve assembly 230 relative to the axis of the deformable fastener assembly 200 and the inner turbine shell 240 possible, in combination with the constant axial load made possible by the deformable fastener assembly 200 described herein. While a bushing 250 is illustrated with the deformable fastener assembly 200, it will be readily appreciated that other types of fastening systems, including by way of example, a shoulder bolt, could be used as well.

As further illustrated, there may be a slight gap 254 between the outside diameter of the mounting flange 231 in the impingement sleeve panel 232 and the vertical wall of the detent 242 in the inner turbine shell 240, into which the mounting flange 231 is received. This gap 254 likewise may permit lateral frictional sliding motion of the panels 232 of the impingement sleeve assembly 230 relative to the axis of the deformable fastener assembly 200 and the inner turbine shell 240 possible.

As further illustrated in FIG. 3, the deformable fastener assembly 200 may include a one-piece assembly allowing the entire deformable fastener assembly 200 to be installed and/or removed in one piece. In the embodiment illustrated, this one-piece assembly may include a bushing engagement member 270, such as a dowel or pin that may pass through a hole 271 in the bushing 250. In another aspect of the one-piece assembly, the bushing 250 may further include a lip 272 that is wider and/or of greater diameter than the bushing upper section 273, and wider and/or of greater diameter than the opening in the lower washer 261. The upper section 273 of the bushing 250 may be sized to fit the opening in the lower washer 261. As illustrated, the bushing engagement member 270 may be received in a notch or groove 214 in the shaft 212 of the fastener 210. This groove 214 may circumscribe the fastener shaft 212. This groove 214, in combination with the bushing engagement member 270 and bushing lip 272, may permit the fastener 210 to be turned, for example, in the case of a bolt or screw, in a threaded connection within the inner turbine shell 240, while maintaining the fastener assembly 200 as a one-piece unit during installation and/or removal.

When a pin is used as the bushing engagement member 270, it may be staked in place within the bushing 250. The groove 214 may be sized, i.e., with sufficient axial length, so as to enable the desired degree of axial travel of the fastener 210 within the bushing 250 during one-piece installation and removal of the deformable fastener assembly 200. The bushing engagement member 270 may permit the bushing 250 to remain engaged with the fastener 210 upon installation and/or removal from the inner turbine shell 240, by contacting a lower lip 215 of the groove 214. With the bushing 250 thus retained on the fastener 210 by the bushing engagement member 270, the lower washer 261 may contact the bushing lip 272 upon installation and/or removal of the deformable fastener assembly 200. In this way, the bushing 250, lower washer 261, deformable member 220, and upper washer 260 may be retained on the deformable fastener assembly 200 as a one-piece unit. Other configurations for one-piece installation and removal of the deformable fastener 200 will now be readily apparent to those of ordinary skill in the art. For example, the inside diameter of the bushing 250 may be threaded, to threadably engage a threaded section of the shaft 212 of the fastener 210, in which case the bushing engagement member may comprise complimentary threaded portions of the bushing 250 and fastener 210.

Figure 4:
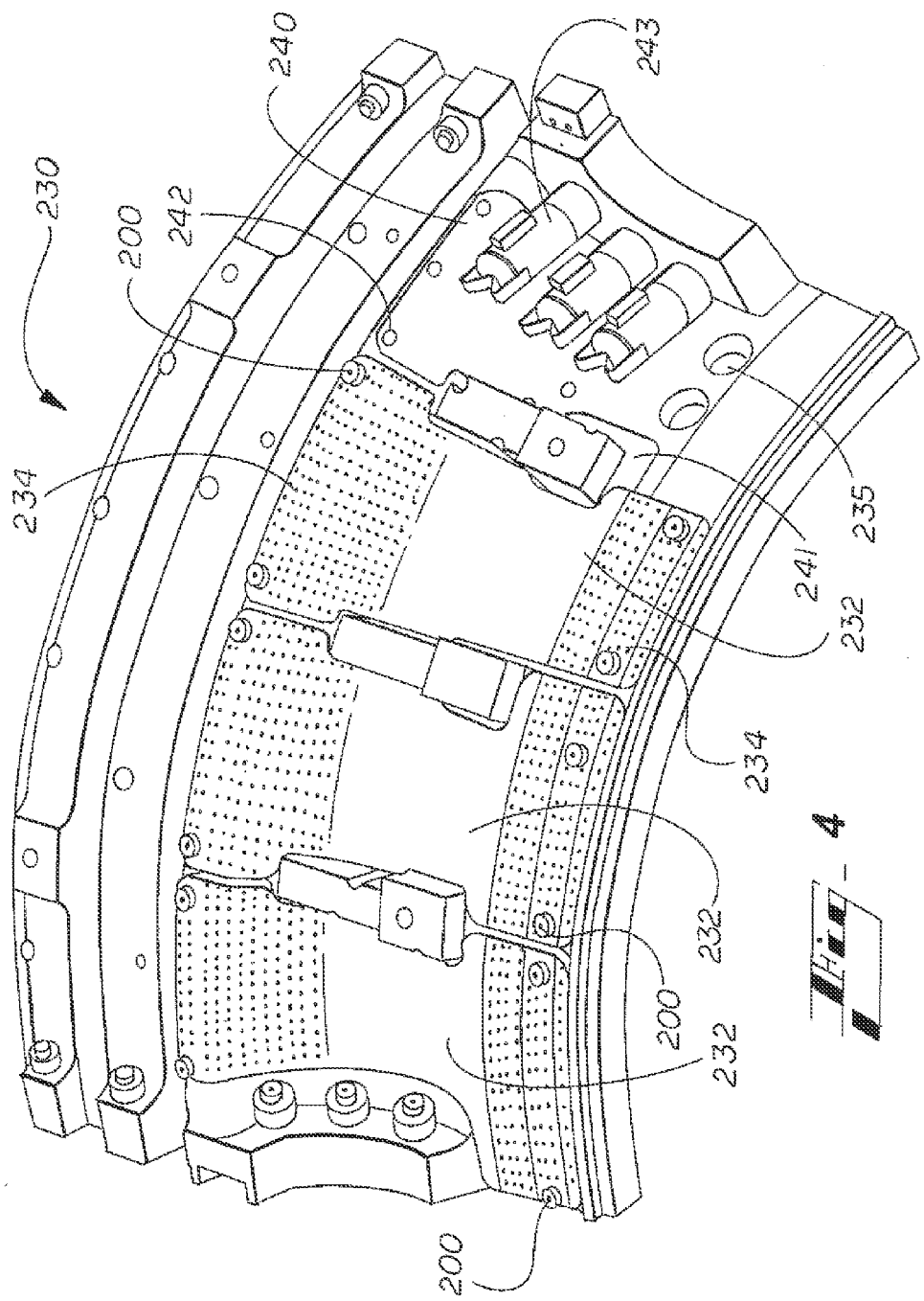
FIG. 4 is an isometric view of a portion of an impingement sleeve assembly as described herein.

Referring now to FIGS. 4 and 5, there is illustrated a portion of an impingement sleeve assembly, generally 230, of a gas turbine engine comprising a plurality of impingement sleeve panels 232 that may be fastened to the interior of an inner turbine shell 240, for example, by employing one or more of the deformable fastener assemblies 200 described herein. In a typical gas turbine engine, there may be 16 of the impingement sleeve assembly units 230 depicted in FIG. 4 used per gas turbine engine.

In the embodiment of FIG. 4, one of the impingement sleeve panels 232 has been removed, revealing tensioners 243 in the inner turbine shell 240. Each impingement sleeve panel 232 may be sized and shaped to fit within a perimeter sealing groove 241 in the inner turbine shell. Each impingement sleeve panel 232 may include a perimeter skirt 233 that allows the impingement sleeve panel 232 to nest within the perimeter sealing groove 241 in the inner turbine shell 240. This perimeter skirt 233 may be generally perpendicular to the surface of the impingement sleeve panel 232, and may be welded thereto. As illustrated, each impingement sleeve panel 232 may include a number of small holes 234. These holes 234 may permit cooling air to pass from the outside of the impingement sleeve assembly 230 through holes 235 in the inner turbine shell, through the holes 234 in the impingement sleeve panels 232, to the region of the combustor to be cooled.

The impingement sleeve assembly 230 may be fastened to an inner turbine shell 240 of the gas turbine engine with a plurality of deformable fastener assemblies 200, such as described herein. The deformable fastener assemblies may each include a fastener, such as a bolt having a deformable member 220 positioned between the head of the fastener and a mounting flange 231 of the impingement sleeve panels 232. As illustrated in FIG. 5, each impingement sleeve panel 232 may have four mounting flanges 231, each receiving one of the deformable fastener assemblies 200 described herein. Other numbers of mounting flanges 231 and deformable fastener assemblies 200 are of course possible.

This written description uses examples to disclose the invention, including the best mode, and also to enable any person of ordinary skill in the art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims or if they include equivalent structural elements with insubstantial differences from the literal languages of the claims.

By way of example, the deformable fastener assemblies described herein may be used for other components of a gas turbine, and may be advantageously used to fasten any casing-mounted component that is subjected to thermal deformation, such as a manifold system, heat shield, or otherwise, that could benefit from a sliding connection, whether to the inner turbine shell or any other casing or rigid portion of a gas turbine engine.

We claim:

1. An impingement sleeve assembly of a gas turbine engine comprising a plurality of impingement sleeve panels fastened to an inner turbine shell of the gas turbine engine with a plurality of deformable fasteners, said inner turbine shell having one or more detents, each detent receives a corresponding mounting flange of the plurality of impingement sleeve panels, and each corresponding mounting flange receives one of the plurality of deformable fasteners,
wherein each of said plurality of deformable fasteners include: a bolt; a deformable member positioned between a head of said bolt and the corresponding mounting flange receiving the deformable fastener, and a bushing received in said corresponding mounting flange, said bushing having an outside diameter,
where said corresponding mounting flange has an inside diameter, the outside diameter of said bushing being smaller than the inside diameter of said corresponding mounting flange, such that said plurality of impingement sleeve panels can displace laterally relative to an axis of at least one of said plurality of deformable fasteners,
where an outside diameter of said corresponding mounting flange is smaller than a diameter of the detent in which said corresponding mounting flange is received, such that said plurality of impingement sleeve panels can displace laterally relative to an axis of at least one of said plurality of deformable fasteners, and
wherein each of said plurality of deformable fasteners further include: a pin, said bushing having a hole therein for receiving said pin, said pin being received by a groove in a shaft of said bolt, thereby permitting said bolt, said bushing, said pin, and said deformable member of each of said plurality of deformable fasteners to be installed in and removed from said plurality of impingement sleeve panels and said inner turbine shell in one piece.

2. The impingement sleeve assembly of claim 1, each said groove circumscribing each said bolt shaft.

3. The impingement sleeve assembly of claim 2, said bushing comprising a lip, wherein when said bolt, said bushing, said pin, and said deformable member of each of said plurality of deformable fasteners are installed in and removed from said plurality of impingement sleeve panels and said inner turbine shell in one piece, said lip is configured to engage a washer positioned between said lip and said deformable member.

4. The impingement sleeve assembly of claim 3, said deformable member being selected from the group comprising one or more Belleville washers, spring washers, washer faced springs, mechanical springs, and combinations thereof.

* * * * *